United States Patent
Nakano et al.

(10) Patent No.: US 7,289,684 B2
(45) Date of Patent: Oct. 30, 2007

(54) MOVING PICTURE PROCESSING APPARATUS

(75) Inventors: Norihiko Nakano, Fujisawa (JP); Motohiro Sugino, Kamakura (JP); Masayuki Higashi, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 751 days.

(21) Appl. No.: 10/811,904

(22) Filed: Mar. 30, 2004

(65) Prior Publication Data

US 2004/0234168 A1 Nov. 25, 2004

(30) Foreign Application Priority Data

May 22, 2003 (JP) .............................. 2003-144261

(51) Int. Cl.
 *G06K 9/60* (2006.01)
(52) U.S. Cl. ...................... 382/305; 382/209; 382/235; 358/403; 358/404; 711/5; 711/100
(58) Field of Classification Search ................ 382/304, 382/305, 307; 358/403, 404, 444; 711/5, 711/100
 See application file for complete search history.

(56) References Cited

U.S. PATENT DOCUMENTS

| | | | | |
|---|---|---|---|---|
| 6,429,812 B1 * | 8/2002 | Hoffberg | .................. | 342/357.1 |
| 6,526,581 B1 * | 2/2003 | Edson | .................. | 725/74 |
| 6,640,145 B2 * | 10/2003 | Hoffberg et al. | .............. | 700/83 |
| 6,817,982 B2 * | 11/2004 | Fritz et al. | .................. | 600/443 |
| 6,850,252 B1 * | 2/2005 | Hoffberg | .................... | 715/716 |

FOREIGN PATENT DOCUMENTS

| | | |
|---|---|---|
| JP | 06-217249 | 8/1994 |
| JP | 08-307811 | 11/1996 |
| JP | 2000-059729 | 2/2000 |

* cited by examiner

*Primary Examiner*—Yosef Kassa
(74) *Attorney, Agent, or Firm*—Antonelli, Terry, Stout & Kraus, LLP.

(57) ABSTRACT

A moving picture processing apparatus in which a buffer residual amount of a buffer module which buffers a plurality of image data which are inputted from the outside is monitored by a storing media control module and a decimation is performed at a decimation ratio which differs every image data, in accordance with the buffer residual amount of the buffer module and in accordance with the frame rate of each of the plurality of image data, so that it can be prevented the inconvenience that a period of time during which the image data is not recorded and cannot be reproduced occurs for a long time.

12 Claims, 9 Drawing Sheets

MOVING PICTURE PROCESSING APPARATUS

BACKGROUND OF THE INVENTION

1. Field of the Invention

The invention relates to an image recording apparatus for selectively recording a plurality of image data.

2. Description of the Related Art

For example, there is JP-A-8-307811 as a prior art regarding the invention.

In JP-A-8-307811, there is a disclosure "When a video signal is compressed and recorded onto a hard disk, the recording is executed so that even if the recording is temporarily stopped due to vibration or the like, the signal can be correctly decoded. An optical image formed on the surface of an image pickup device via a lens and an iris is converted into an electric signal and processed by a camera signal processing circuit. In this step, the electric signal is converted into a digital signal. The image is compressed by a compressing circuit and temporarily stored into a memory. Data is sequentially read out from the memory and written onto the hard disk via an input/output managing circuit and a write control circuit. When a vibration detecting circuit detects vibration, the recording onto the hard disk is temporarily interrupted in order to avoid the erroneous recording. After the vibration is settled, the data under the writing is read out again from the memory and recorded."

SUMMARY OF THE INVENTION

According to the technique disclosed in JP-A-8-307811, a buffer is further monitored and when the recording to the hard disk is interrupted for a long time, the recording data is selected in order to prevent a residual amount of the buffer from being reduced and run out. However, the image data relates to only one input signal as a target and a plurality of image data are not selectively recorded.

For example, in an image recording apparatus for recording a plurality of image data derived from monitoring cameras or the like, hitherto, the image recording apparatus has controlled a plurality of cameras. Therefore, such a problem that the buffer of the image recording apparatus is reduced and run out is not caused. However, if the cameras are out of the targets of control from the image recording apparatus, the image recording apparatus has to record image data which is transferred from a plurality of cameras out of the control targets. In this case, an amount of data which is transferred to the image recording apparatus is uncertain and it is difficult to manage it. When the amount of data which is transferred (that is, an input) is larger than a recording band (output) of a storing media, a residual amount of buffer is reduced and run out.

Therefore, the image data is selected like a technique disclosed in JP-A-8-307811. In this instance, if a plurality of image data is similarly decimated, there is a case where the image data of a low frame rate is also included in the plurality of image data. If the image data is decimated in a manner similar to the image data of a high frame rate, such a problem that the image data is not recorded for a long time occurs.

It is an object of the invention to provide an image recording apparatus for recording a plurality of image data, wherein when a buffer is reduced and run out, the image data is decimated in consideration of a balance of frame intervals of the image data.

To accomplish the above object, the invention is characterized in that image data is decimated in accordance with a frame rate of each of a plurality of image data which are inputted.

Other objects, features and advantages of the invention will become apparent from the following description of the embodiments of the invention taken in conjunction with the accompanying drawings.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF THE EMBODIMENTS

Embodiments of the invention will be described hereinbelow with reference to the drawings.

Figure 1:
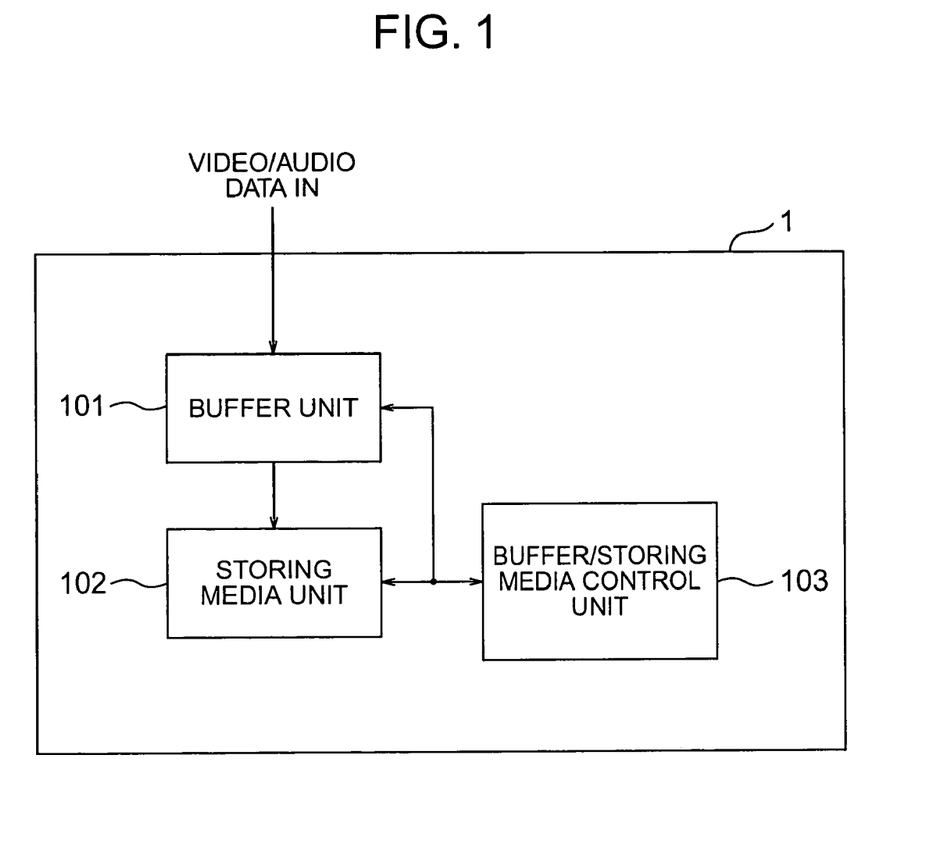
FIG. 1 is a schematic diagram showing an image recording system according to the first embodiment of the invention.

FIG. 1 is a schematic diagram showing an image recording system according to the first embodiment of the invention. In FIG. 1, reference numeral 1 denotes an image recording apparatus; 101 a buffer unit as temporary recording means; 102 a storing media unit as recording means for recording image data into a recording medium; and 103 a buffer/storing media control unit as control means.

In the image recording apparatus 1, the buffer unit 101 buffers (temporarily stores) image data, that is, recording request data which is inputted from the outside. The image data which is inputted can be any one of an audio sound only, a video image only, and mixture data of the video image and the audio sound. In the storing media unit 102, a recording storing process of the image data which is buffered by the buffer unit 101 is executed. A storage media such as HDD, DVD-RAM, or the like or a semiconductor can be used as a recording medium in which the storing media unit 102 records the image data. In the buffer/storing media control unit 103, a buffer residual amount of the buffer unit

101 is monitored and the recording storing process of the storing media unit 102 is controlled.

Figure 2:
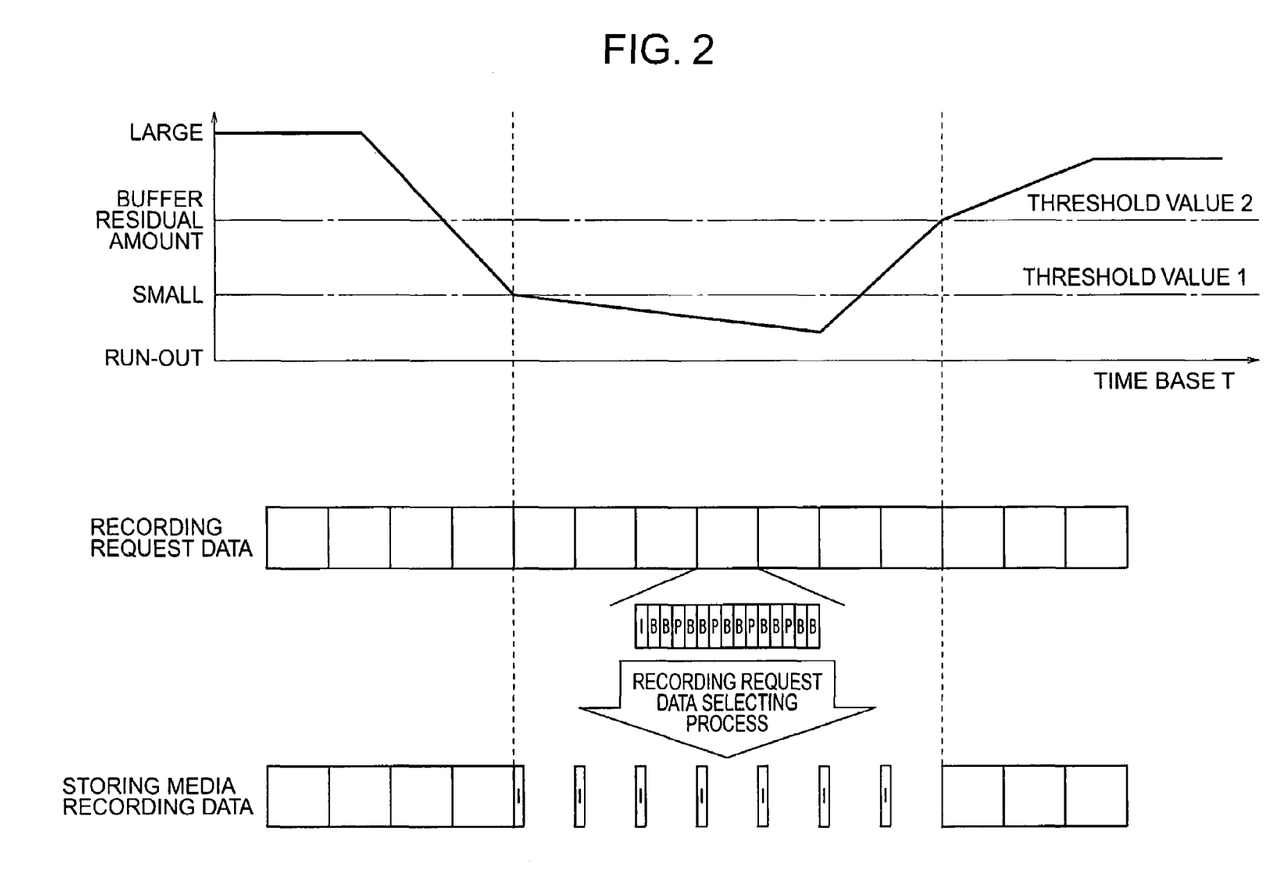
FIG. 2 is a first diagram showing an example of an image data selecting process of the image recording system according to the first embodiment of the invention.

FIG. 2 is a first diagram showing an example of an image data selecting process of the image recording system according to the first embodiment of the invention. In FIG. 2, an upper portion shows a relation between the elapse of time and the buffer residual amount and a lower portion shows a relation between the recording request data and the storing media recording data according to the buffer residual amount.

If a recording request data amount (input) becomes larger than a recording band (output) of the storing media because the recording band of the storing media fluctuates (for example, in the case of the HDD, an alternate sector is used or a retrying process is frequently executed) or the recording request data amount increases, the buffer residual amount decreases as shown in the upper portion of FIG. 2. If a period of time during which such a recording request data amount (input) becomes larger than the recording band (output) of the storing media is long, it becomes a cause of occurrence of inconvenience that the buffer is run out and the image recording system is broken.

In the embodiment, the buffer/storing media control unit 103 monitors the buffer residual amount and if the buffer residual amount is smaller than a threshold value 1 as shown in the upper portion of FIG. 2, a selecting process of the recording request data in which the buffering in the buffer unit 101 of the image data which is inputted from the outside, that is, the recording request data is decimation-executed is executed in the buffer/storing media control unit 103 as shown in the lower portion of FIG. 2. Therefore, the run-out of the buffer residual amount can be prevented. It is sufficient to finish such a recording request data selecting process when the buffer residual amount becomes larger than a threshold value 2 as shown in the upper portion of FIG. 2.

If the recording request data is an image signal in which information based on a time-dependent picture correlation has been compression-encoded, for example, an MPEG signal, the image signal is constructed by I pictures (Intraframe coded pictures), P pictures (Interframe forward predictive coded pictures), and B pictures (Bidirectionally predictive coded pictures) as shown in the lower portion of FIG. 2. Although the P picture or the B picture cannot be decoded even if it is solely recorded, the I picture can be solely decoded, reproduced, and displayed. Therefore, if the recording request signal is the image signal in which the information based on the time-dependent picture correlation has been compression-encoded, the selecting process of the recording request data in which the Intraframe coded picture is preferentially bufferring-recorded and the non-Intraframe coded pictures are preferentially abandoned and are not bufferring-recorded is executed in the buffer/storing media control unit 103. Owing to the selecting process in which the Intraframe coded picture is preferentially recorded, even if the image data is decimation-recorded, recording that is preferable to the decoding, reproduction, and display can be performed and a situation that a period of time during which the data cannot be reproduced continues for a long time can be prevented. By decimating the image data by the selecting process, a use amount of the buffer can be reduced, the buffer residual amount is not run out, and it can be prevented the inconvenience that the image recording system is broken.

Figure 3:
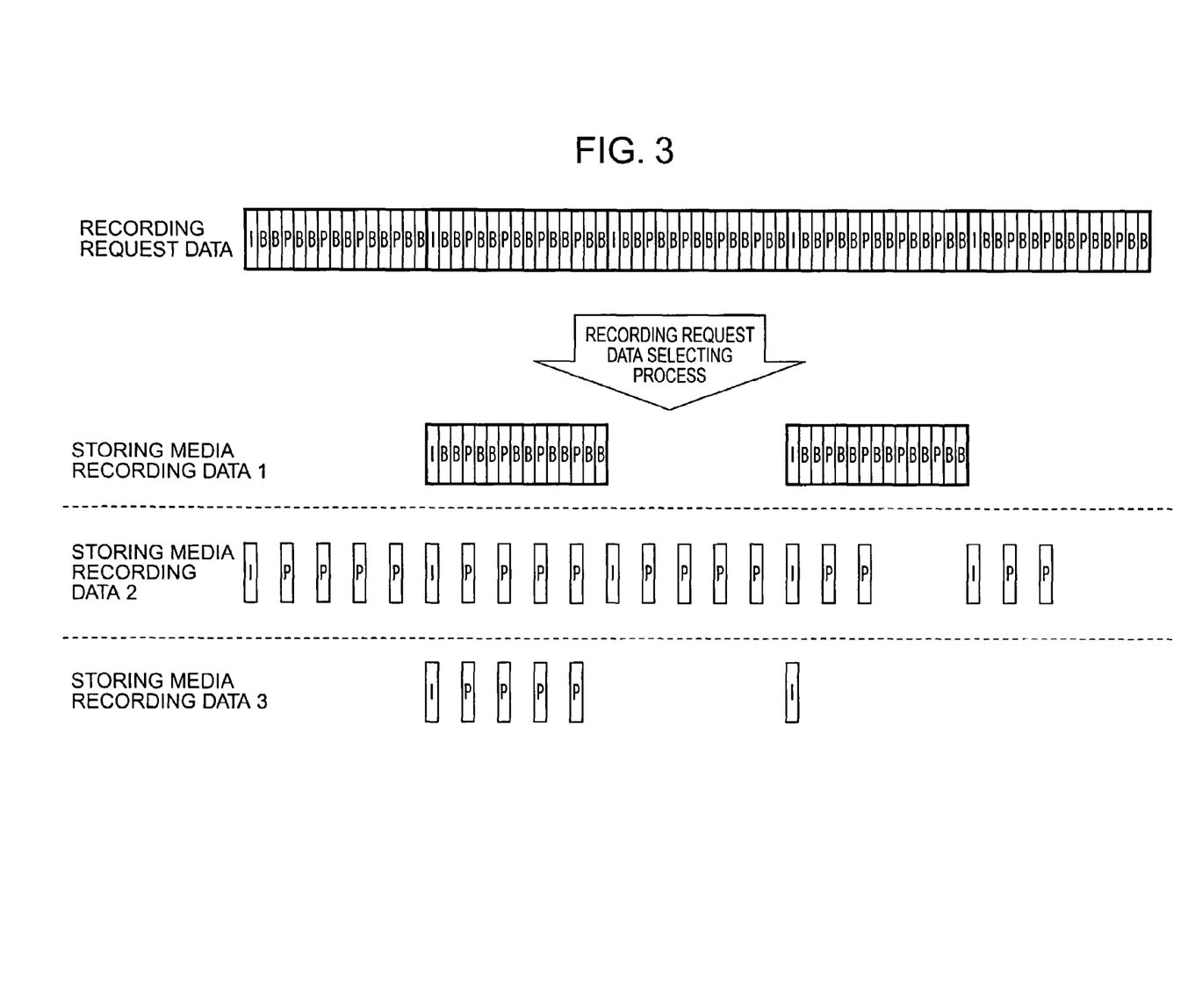
FIG. 3 is a second diagram showing an example of the image data selecting process of the image recording system according to the first embodiment of the invention.

FIG. 3 is a second diagram showing an example of the image data selecting process of the image recording system according to the first embodiment of the invention. FIG. 3 shows three examples with respect to a relation between the recording request data and storing media recording data according to the buffer residual amount.

If the recording request data is the image signal in which the information based on the time-dependent picture correlation has been compression-encoded, for example, the MPEG signal, it is constructed by a GOP (Group of Pictures) structure including at least one Intraframe coded picture. Although the P picture or the B picture cannot be decoded even if it is solely recorded, it can be decoded, reproduced, and displayed on a GOP unit basis. Therefore, as shown in storing media recording data 1 in FIG. 3, if the recording request signal is the image signal in which the information based on the time-dependent picture correlation has been compression-encoded, the selecting process is executed in the buffer/storing media control unit 103 on a GOP unit basis. Owing to the selecting process based on the GOP unit, even if the image data is decimation-recorded, the recording that is preferable to the decoding, reproduction, and display can be performed and it can be prevented a situation that a period of time during which the data cannot be reproduced occurs for a long time. By decimating the image data by the selecting process, the use amount of the buffer can be reduced, the buffer residual amount is not run out, and it can be prevented the inconvenience that the image recording system is broken.

Although the P picture or the B picture cannot be decoded even if it is solely recorded, the P picture can be decoded, reproduced, and displayed even if there is no B picture (even if there are only the I picture and the P picture). Therefore, as shown in storing media recording data 2 in FIG. 3, the selecting process of the recording request data in which the I picture and the P picture are preferentially bufferring-recorded and the B picture is preferentially abandoned and is not bufferring-recorded is executed in the buffer/storing media control unit 103. Owing to the selecting process in which the I picture and the P picture are preferentially recorded, even if the image data is decimation-recorded, the recording that is preferable to the decoding, reproduction, and display can be performed and it can be prevented a situation that a period of time during which the data cannot be reproduced occurs for a long time. By decimating the image data by the selecting process, the use amount of the buffer can be reduced, the buffer residual amount is not run out, and it can be prevented the inconvenience that the image recording system is broken. Further, the use amount of the buffer can be further reduced by decimating the P picture which is farther than the I picture with respect to time.

The selecting process of the recording request data mentioned above can be combined and used as shown in storing media recording data 3 in FIG. 3. By using the selecting process in which the recording request data is not buffered but abandoned and is not recorded, the selecting process in which the Intraframe coded picture is preferentially recorded, the selecting process in which the I picture and the P picture are preferentially recorded, or the selecting process based on the GOP unit in accordance with the buffer residual amount as mentioned above, even if the image data is decimation-recorded, the recording that is preferable to the decoding, reproduction, and display can be performed and it can be prevented a situation that a period of time during which the data cannot be reproduced occurs for a long time. By decimating the image data by the selecting process, the use amount of the buffer can be reduced, the buffer residual amount is not run out, and the inconvenience that the image recording system is broken is not caused. The recording data according to the buffer residual amount, that is, a data transfer band of the storing media can be formed.

As mentioned above, according to the embodiment, by monitoring the buffer residual amount and using the selecting process in which the recording request data is not buffered but abandoned and is not recorded, the selecting process in which the Intraframe coded picture is preferentially recorded, the selecting process in which the I picture and the P picture are preferentially recorded, or the selecting process based on the GOP unit, the recording data can be selected in accordance with the data transfer band of the storing media. The image recording apparatus in which a period of time during which the image data is not normally recorded and cannot be reproduced does not continue for a long time can be constructed.

Figure 4:
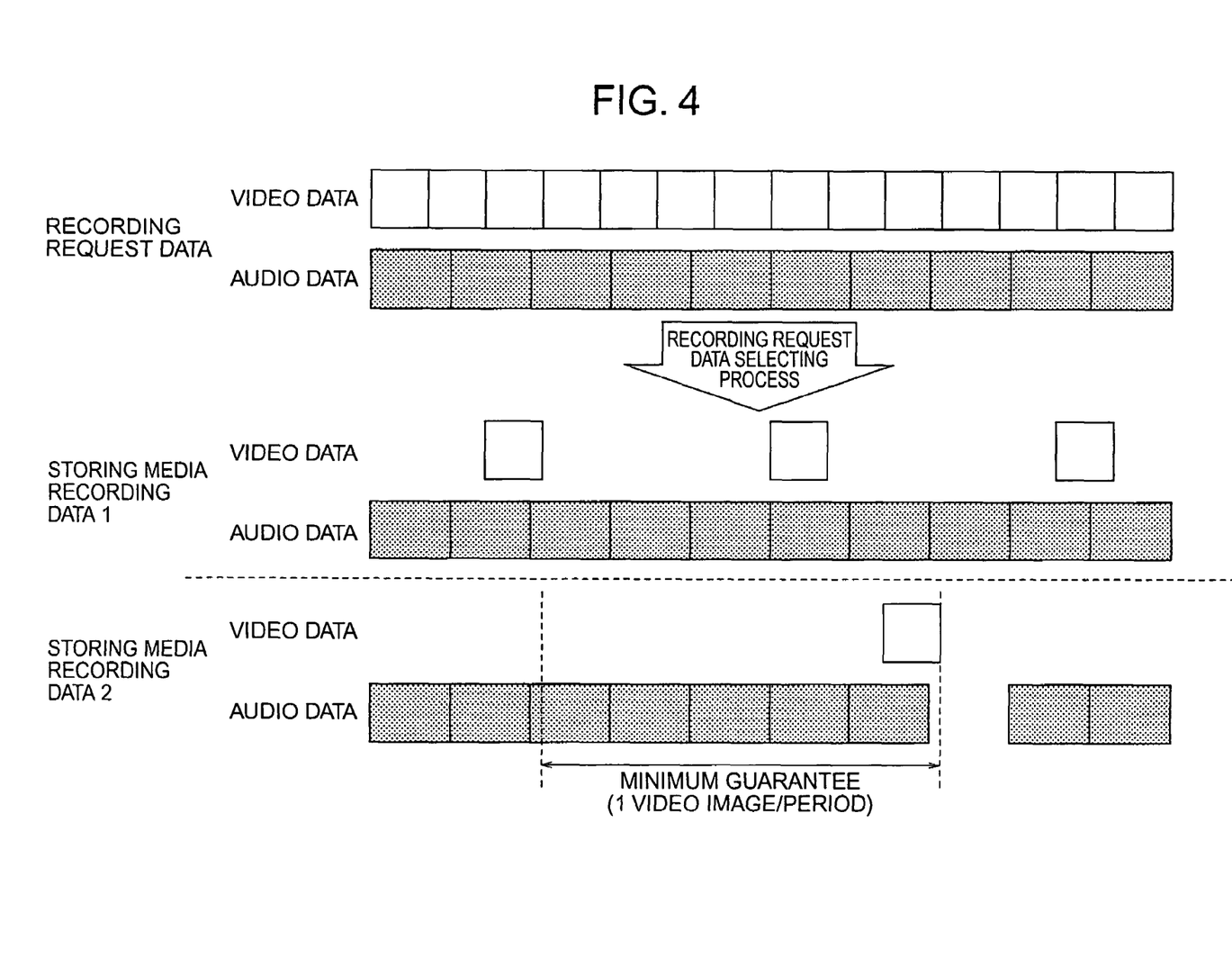
FIG. 4 is a diagram showing an example of an image data selecting process of an image recording system according to the second embodiment of the invention.

FIG. 4 is a diagram showing an example of an image data selecting process of an image recording system according to the second embodiment of the invention. FIG. 4 shows a relation between the recording request data and the storing media recording data according to the buffer residual amount. The recording request data as image data is divided into video data and audio data.

Even if the video data is decimated and recorded (for example, 30 pictures per second are decimated to 10 pictures per second), a flow of the whole motion and operation can be grasped. However, if the audio data is decimated and recorded (for example, the data of 0.3 second is decimated every second), the decoded and reproduced audio sound is difficult for the user to listen to it and there is a case where important words and sound during conversation are dropped out. Therefore, as shown in the storing media recording data 1 in FIG. 4, the selecting process of the recording request data in which the audio data is preferentially buffering-recorded and the video data is preferentially abandoned and is not bufferring-recorded is executed in the buffer/storing media control unit 103. Owing to the selecting process in which the audio data is preferentially recorded as mentioned above, even if the image data is decimation-recorded, the recording that is preferable to the decoding reproduction of the audio sound can be performed and a period of time during which the audio sound is not reproduced can be shortened and reduced. By decimating the image data by the selecting process, the use amount of the buffer can be reduced, the buffer residual amount is not run out, and the inconvenience that the image recording system is broken is not caused. The recording data can be formed in accordance with the buffer residual amount, that is, the data transfer band of the storing media.

However, if the selecting process of the recording request data in which the audio data is preferentially buffering-recorded and the video data is preferentially abandoned and is not bufferring-recorded as mentioned above is used, there is a possibility of the occurrence of a period of time during which the video data does not exist for a long time due to the recorded image data. Therefore, as shown in the storing media recording data 2 in FIG. 4, when the selecting process of the recording request data in which the audio data is preferentially buffering-recorded and the video data is preferentially abandoned and is not bufferring-recorded is executed, a selecting process in which the video data is preferentially bufferring-recorded up to the minimum number of image data per unit time over the audio sound is additionally executed in consideration of a guaranteeing period of time of the minimum number of image data of the video data (for example, one video image/arbitrary period of time). Owing to the selecting process in which the audio data is preferentially recorded while the highest priority is given to the guarantee of the minimum number of image data of the video data as mentioned above, even if the image data is decimation-recorded, a period of time during which the video image is not reproduced is not caused for a long time and a period of time during which the audio sound is not reproduced can be shortened and reduced.

According to the embodiment as mentioned above, if the image data comprises the audio data and the video data, the buffer residual amount is monitored and by using the selecting process in which the audio data is preferentially recorded and, further, the selecting process in which the audio data is preferentially recorded while giving the highest priority to the guarantee of the minimum number of image data of the video data, the recording data can be selected in accordance with the data transfer band of the storing media. The image recording apparatus in which even if the image data is decimation-recorded, a period of time during which the video image is not reproduced is not caused for a long time and a period of time during which the audio data is not reproduced can be shortened and reduced can be constructed.

Figure 5:
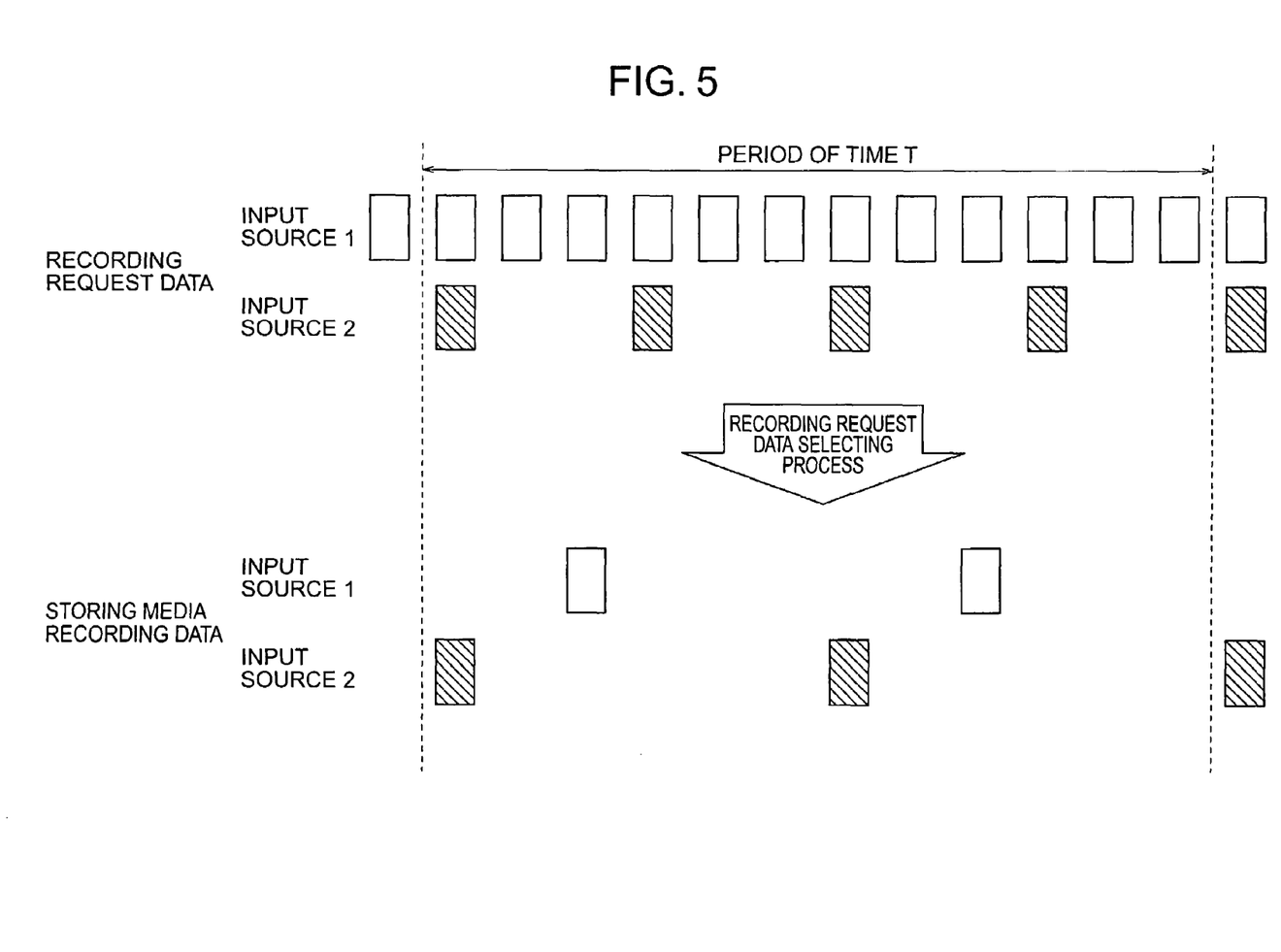
FIG. 5 is a diagram showing an example of an image data selecting process of an image recording system according to the third embodiment of the invention.

FIG. 5 is a diagram showing an example of an image data selecting process of an image recording system according to the third embodiment of the invention. FIG. 5 shows a relation between the recording request data and the storing media recording data according to the buffer residual amount. The recording request data as image data is inputted from a plurality of (two in FIG. 5) sources (for example, in a monitoring camera system, the video signal inputting sources: cameras). There is a case where frame rates of the image data which is inputted from a plurality of sources differ in dependence on the sources.

In the case where the selecting process according to the buffer residual amount is executed for a period of time t, if the image data is simply decimated at a decimation ratio of 1/4 every input source, the data from an input source 1 is decimated from 12 image data to 3 image data and the data from an input source 2 is decimated from 4 image data to 1 image data. As mentioned above, if the decimating process is executed to the input sources at the uniform rate, there is a case where the image data is not recorded for a long time in dependence on an interval of the input sources of the recording request data. Therefore, for example, as shown in the storing media recording data of FIG. 5, the selecting process of the image data is executed so that the data from the input source 1 is decimated into 1/6, that is, from 12 image data to 2 image data and the data from the input source 2 is decimated into 1/2, that is, from 4 image data to 2 image data in consideration of the interval of the recording request data of each input source without decimating the image data from a plurality of sources at the uniform rate. By executing such a selecting process in consideration of the balance of the interval of the recording request data of each input source, a variation in interval of the storing media recording data of each input source can be suppressed and it can be prevented a situation that the image data is not recorded for a long time. When the selecting process is executed, it is also possible to shift the start timing of the decimating period every camera.

An example of decimating the image data in such a manner that the same number of image data obtained after the decimation exists in a unit time is shown here. That is, since the input source 1 is the 12 image data per unit time and the input source 2 is the 4 image data per unit time, the data from the input source 1 is decimated at the decimation ratio that is three times as large as that of the input source 2 so as to equalize the image data obtained after the decimation. However, the invention is not limited to such decimation ratios. For example, it is possible to decimate the input source 1 at the decimation ratio 1/4 and decimate the input source 2 at the decimation ratio 1/2 or decimate them at other various decimation ratios. That is, since the number of image data per unit time of the input source 1 is larger than that for the input source 2, it is important to set the decimation ratio for the input source 1 to be larger than that for the input source 2.

The compensation of the minimum number of image data can be also set like the second embodiment. For example, assuming that at least two image data has to exist in the unit time t, if the data from either of the input sources is decimated at the decimation ratio 1/4, the number of image data of the input source 2 is equal to 1, so that this value is smaller than the set number of image data of the compensation of the minimum number of image data. Therefore, the decimation ratio of the input source 2 has to be equal to or larger than 1/2. Since the input source 1 is the 12 image data, it is sufficient to set the decimation ratio to 1/6 or more.

As mentioned above, when a plurality of image data are inputted, the decimation ratios of the respective image data can be made different in accordance with the number of image data per unit time (that is, frame rate).

According to the embodiment as mentioned above, when the image data comprises the inputs from a plurality of sources, the buffer residual amount is monitored and the selecting process which takes into consideration of the balance of the interval of the image data of each input source is used, so that the image recording apparatus in which the variation in recording interval of each input source can be suppressed and a period of time during which a certain input source cannot be reproduced is not caused for a long time can be constructed.

Figure 6:
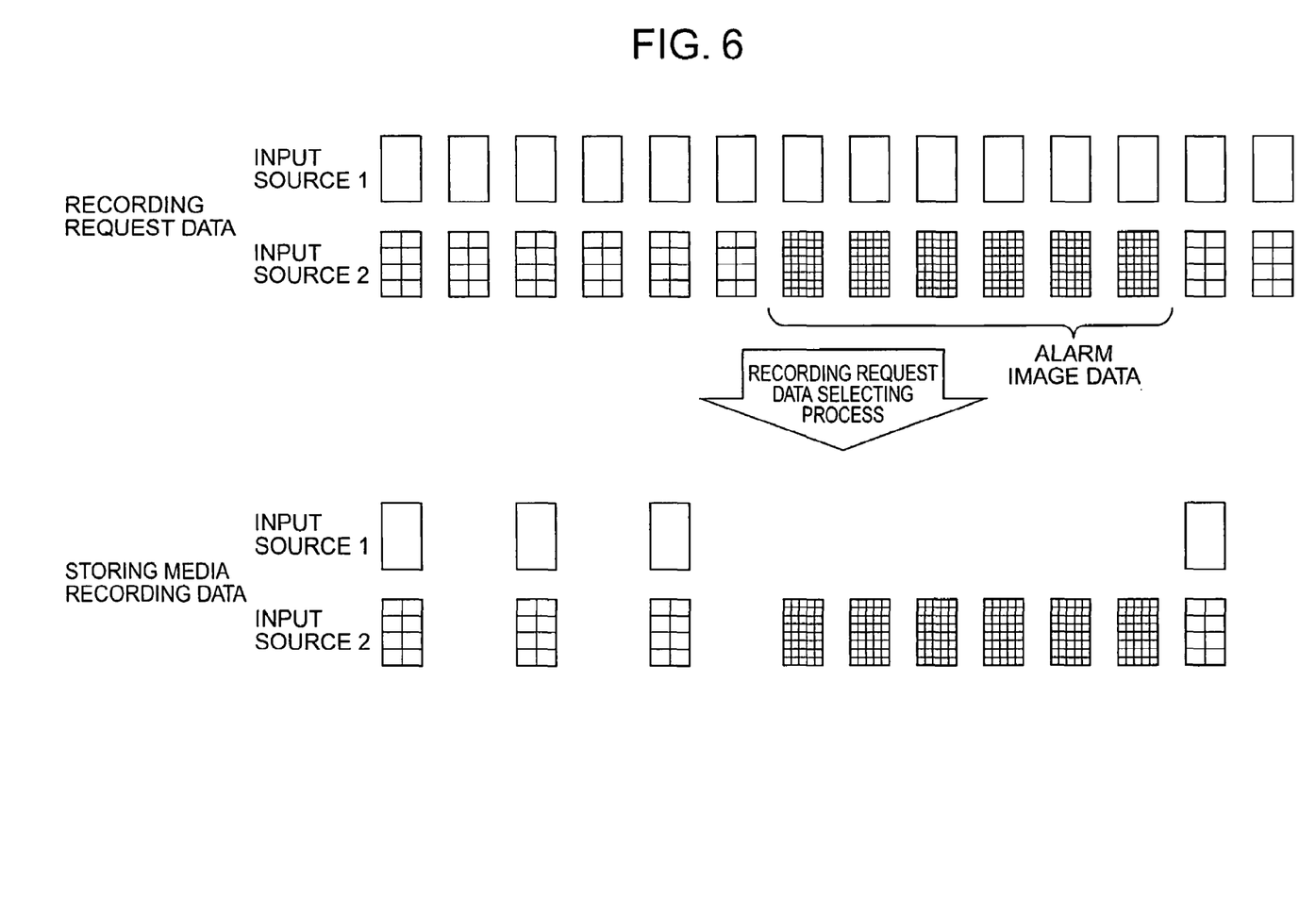
FIG. 6 is a diagram showing an example of an image data selecting process of an image recording system according to the fourth embodiment of the invention.

FIG. 6 is a diagram showing an example of an image data selecting process of an image recording system according to the fourth embodiment of the invention. FIG. 6 shows a relation between the recording request data and the storing media recording data according to the buffer residual amount. The recording request data as image data is inputted from a plurality of (two in FIG. 6) sources (for example, in the monitoring camera system, the video signal inputting sources: cameras) and alarm images are also inputted.

In the image recording system which is used in the monitoring camera system, there is a case where image data of an alarm at the time of an emergency/alarm generation such as fire, crime, or the like is recorded. At the time of the emergency/alarm generation, more detailed information is necessary to confirm a situation and specify a criminal and a drop-out of data causes a fatal deterioration in performance. As shown in FIG. 6, therefore, in the case of executing the selecting process of the recording request data in accordance with the monitoring result of the buffer residual amount, a process in which the alarm image is preferentially bufferring-recorded and a non-alarm image is preferentially abandoned and is not bufferring-recorded is executed. By executing such a selecting process in which the priority is given to the alarm, the drop-out of important data can be prevented and performance as an image recording apparatus of the monitoring camera system can be held.

The alarm image used here denotes image data which is designated by the alarm signal. There is a case where the alarm signal is inputted from the outside via alarm signal input means (not shown) or there is a case where the alarm signal is included in the image data which is inputted and the alarm signal is detected from the image data by alarm signal detecting means (not shown).

According to the embodiment as mentioned above, when the image data is inputted from a plurality of sources and the alarm image is also inputted, the buffer residual amount is monitored and the selecting process in which the priority is given to the alarm image is used, so that the drop-out of the alarm image can be prevented and an image recording apparatus which keeps the performance as an image recording apparatus of the monitoring camera system can be constructed.

Figure 7:
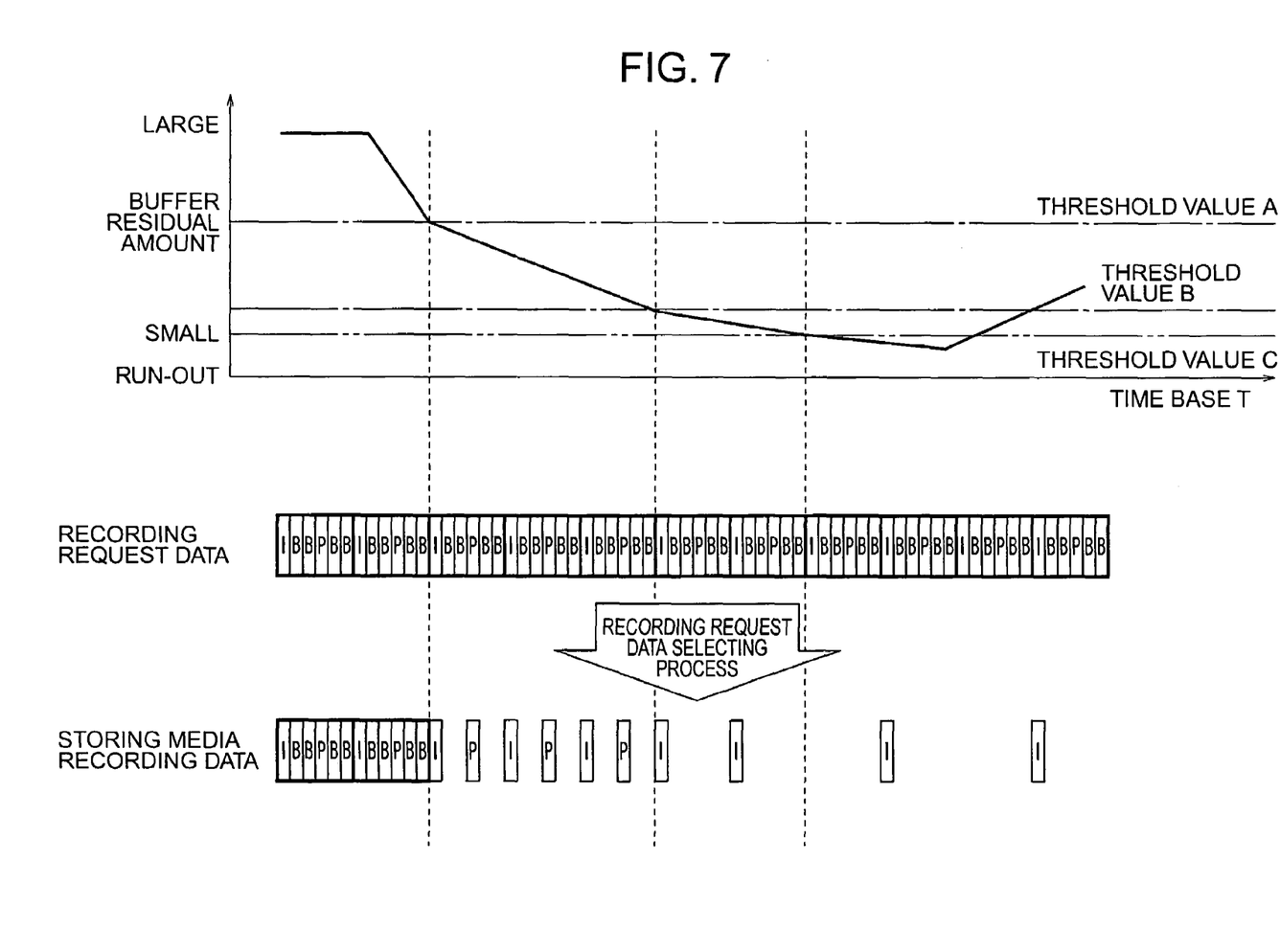
FIG. 7 is a diagram showing an example of an image data selecting process of an image recording system according to the fifth embodiment of the invention.

FIG. 7 is a diagram showing an example of an image data selecting process of an image recording system according to the fifth embodiment of the invention. In FIG. 7, an upper portion shows a relation between the elapse of time and the buffer residual amount and a lower portion shows a relation between the recording request data and the storing media recording data according to the buffer residual amount.

In FIG. 7, the selecting process of the image data is switched to multi-stages in accordance with the buffer residual amount. As shown in FIG. 7, if the recording request data is the MPEG data, when the buffer residual amount is smaller than a threshold value A, the selecting process in which the I picture and the P picture are preferentially recorded is executed. When the buffer residual amount is smaller than a threshold value B, the selecting process in which the Intraframe coded picture is preferentially recorded is executed. When the buffer residual amount is smaller than a threshold value C, the selecting process according to the decimation based on the GOP unit is further executed. Thus, in accordance with the buffer residual amount to which the data transfer band of the storing media is reflected, the smaller the residual amount is, the more the image data can be abandoned in the selecting process and the more the reduction in buffer residual amount can be made gently.

According to the embodiment as mentioned above, by switching the selecting process of the image data to the multi-stages in accordance with the buffer residual amount, the buffer residual amount can be gently decreased and the recording data can be selected in accordance with the data transfer band of the storing media.

Figure 8:
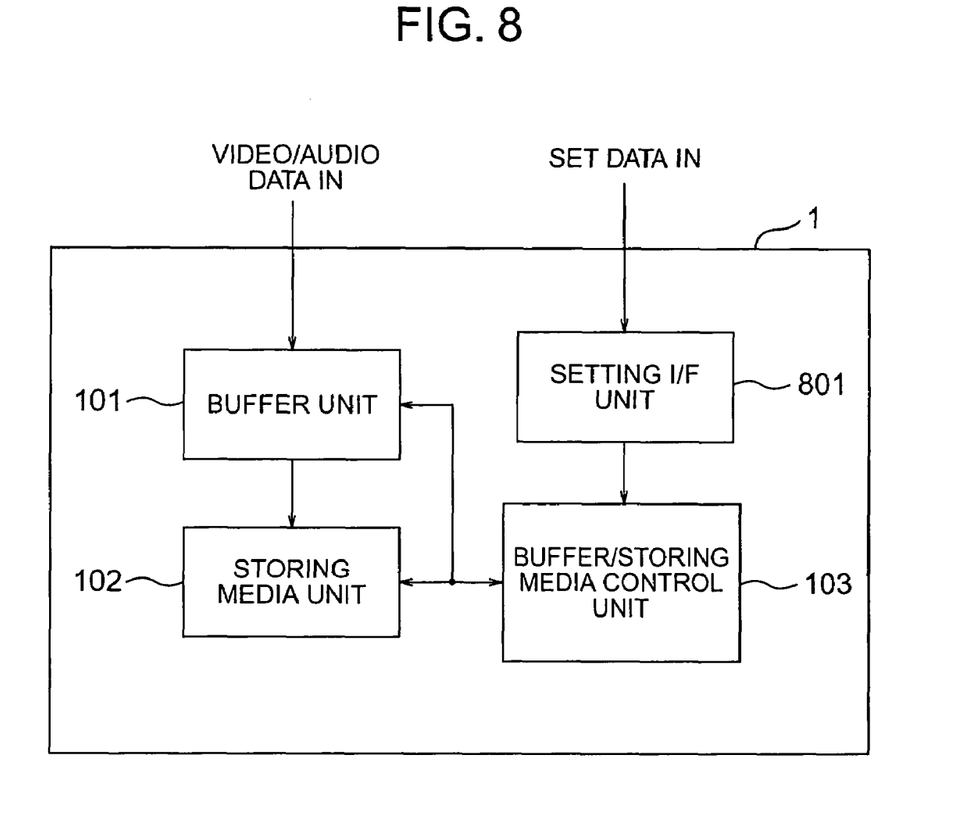
FIG. 8 is a schematic diagram showing an image recording system according to the sixth embodiment of the invention.

FIG. 8 is a schematic diagram showing an image recording system according to the sixth embodiment of the invention. The system has a setting I/F unit as a component element as compared with FIG. 1 showing the first embodiment.

A setting I/F unit 801 fetches set data from the outside and outputs it to the buffer/storing media control unit 103. In the buffer/storing media control unit 103, the selecting process of the image data is executed by using the set data obtained from the setting I/F unit 801. As set data, there are: data of the threshold value for switching the selecting process of the image data; data for selecting the decimation processing method; data showing that, in the case where the image data is inputted from a plurality of sources, the data of which input source is preferentially bufferring-recorded and the data of which input source is preferentially abandoned and is not bufferring-recorded; data indicative of the specific decimation ratio of each input source or data indicative of the range of the decimation ratio; and the like. By using the set data from the outside as mentioned above, the selecting process of the image data to which the user's intention is reflected can be executed.

According to the embodiment as mentioned above, by using the set data from the outside, the image recording system which can execute the selecting process of the image data to which the user's intention is reflected when the recording data is selected in accordance with the data transfer band of the storing media can be constructed.

Figure 9:
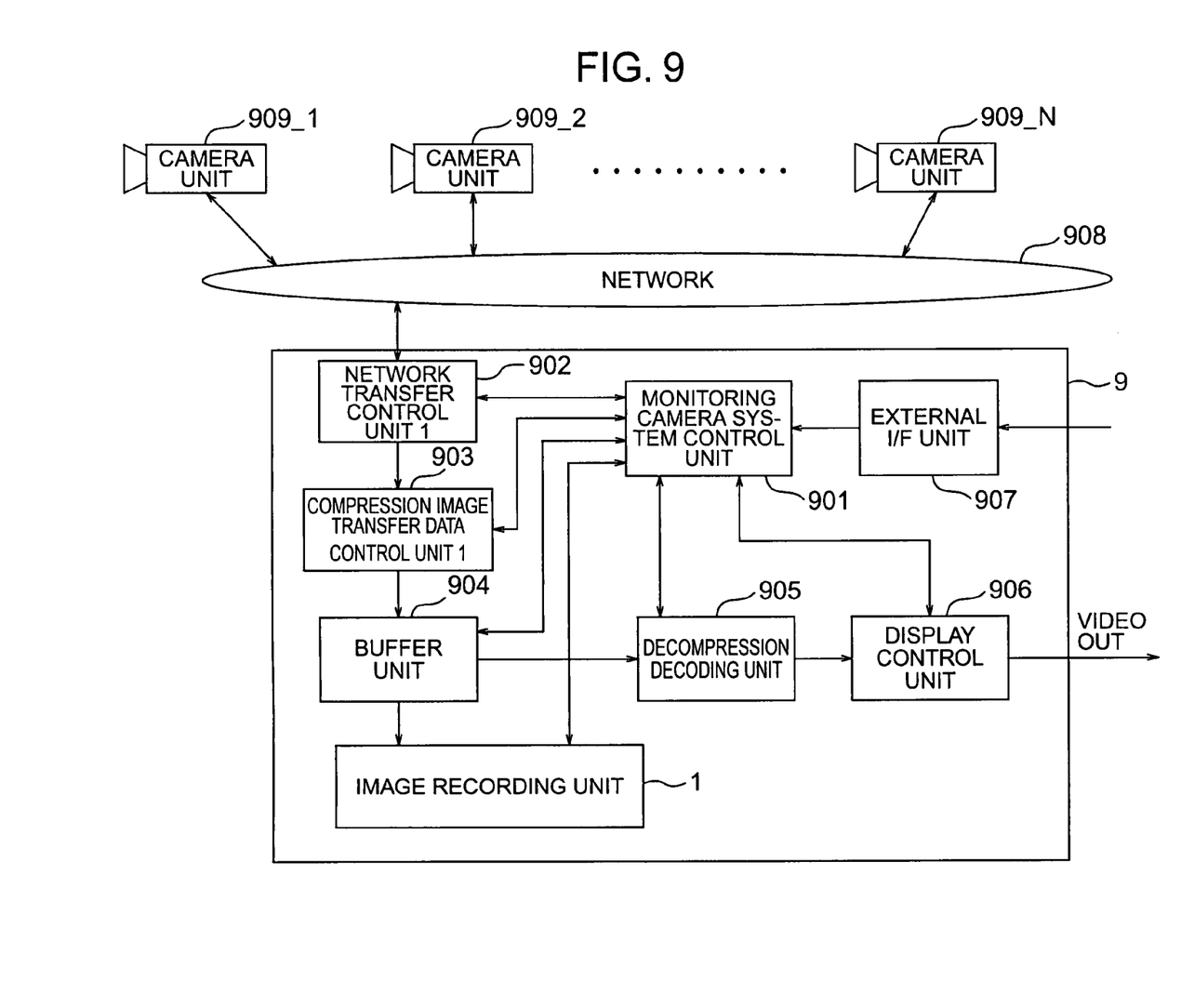
FIG. 9 is a schematic diagram showing an image recording system according to the seventh embodiment of the invention.

FIG. 9 is a schematic diagram showing an image recording system according to the seventh embodiment of the invention. The image recording unit 1 is the image recording apparatus in each of the foregoing first to sixth embodiments. Camera units 909_1 to 909_N as the image recording apparatuses photograph an object, form image data, compress the image data, and transmit the compressed data to a network 908. The network 908 is a network such as an LAN or the like. A controller 9 receives the image data from the camera units 909 via the network 908 and records. A monitoring camera system control unit 901 controls each unit in the controller. A network transfer control unit 902 receives the image data from the network. A compression image transfer data control unit 903 discriminates that the image data has been transmitted from which one of the camera units 909, discriminates that the image data is which one of the I, P, and B pictures, or the like from the received image data. A buffer unit 904 is a buffer for temporarily storing the received data before it is transferred to the image recording unit 1 or before it is transferred to a decompression decoding unit 905. The decompression decoding unit 905 decompression decodes the image data from the buffer unit 904. A display control unit 906 outputs the image data which has been decompression decoded by the decompression decoding unit 905 in a form in which it can be displayed by display means (not shown) provided outside. An external I/F unit 907 is an interface which inputs an operation signal from operating means (not shown) provided outside and outputs it to the monitoring camera system control unit 901.

The operation of each unit in the embodiment is as follows. First, the camera units 909 photograph the object, form the image data, compress it, and output the compressed data to the network 908. A frame rate of the output is independent in each camera unit 909 (out of the control targets of the controller 9). The image data outputted from the camera units 909 is inputted to the controller 9 via the network 908. The inputted image data is sent to the image recording unit 1 via the network transfer control unit 902, compression image transfer data control unit 903, and buffer unit 904. Since a plurality of camera units 909 independently output the image data without being controlled by the controller as mentioned above, the image data which is inputted to the image recording unit 1 is irregular. The residual amount in the buffer unit 101 in the image recording unit 1 is reduced and run out due to various factors. Therefore, the apparatus operates as explained in the first to sixth embodiments mentioned above, thereby solving such a problem.

The example in which the reduction and run-out of the residual amount in the buffer unit 101 are avoided by the decimation in the buffer unit 101 has been described above. In addition to such a construction, it is also possible to construct the apparatus in such a manner that when the residual amount in the buffer unit 101 is reduced and run out, the camera unit 909 is instructed from the image recording unit 1 (from the controller 9) via the network to reduce the frame rate. When the camera unit receives such an instruction, it reduces the frame rate and outputs the image data.

Although the buffer/storing media control unit 103 and the monitoring camera system control unit 901 have separately been described above, a construction in which one control unit has the functions of both of them can be also used. Although the buffer unit 101 and the buffer unit 904 have also separately been described above, a construction in which one buffer unit has the functions of both of them can be also used.

According to the embodiment as mentioned above, a plurality of camera units connected to the controller via the network can freely photograph the object and compress and output the image data without being largely controlled by the controller.

Although details of the buffer/storing media control unit 103 are not mentioned in the above description, for example, the buffer/storing media control unit 103 can be also constructed by an upper layer by software and a lower layer by hardware. The foregoing decimating process can be also processed in the lower layer on the basis of information included in the image data (it is now assumed that information which is used for discrimination upon decimation regarding whether the encoding is the intraframe encoding or the non-intraframe encoding, whether the image is the alarm image or the non-alarm image, and the like has previously been included in the image data). In this case, an effect that a load on the software process is lightened can be obtained.

According to the invention, in the image recording apparatus for recording a plurality of image data, even in the case where the buffer residual amount is reduced and run out and the image data is decimated, the image data can be recorded with a good balance of the frame rates of the respective image data.

While we have shown and described several embodiments in accordance with our invention, it should be understood that disclosed embodiments are susceptible of changes and modifications without departing from the scope of the invention. Therefore, we do not intend to bound by the details shown and described herein but intend to cover all such changes and modifications within the ambit of the appended claims.

What is claimed is:

1. An image recording apparatus comprising:
an input module to which a plurality of image data of different frame rates are inputted;
a temporary storing module which temporarily stores said plurality of image data which are outputted from said input module;
a recording module which records said plurality of image data which are outputted from said temporary storing module onto a recording medium; and
a control module which controls in such a manner that when a residual amount of said temporary storing module is equal to or less than a predetermined value, each of said plurality of image data which are temporarily stored by said temporary storing module is decimated at a decimation ratio according to the frame rate of said image data, and any of the frame rates of said plurality of image data which are recorded onto said recording medium becomes equal to or larger than a predetermined value.

2. An image recording apparatus comprising:
an input module to which a plurality of image data are inputted;
a temporary storing module which temporarily stores said plurality of image data which are outputted from said input module;
a recording module which records said plurality of image data which are outputted from said temporary storing module onto a recording medium; and
a control module which decimates said plurality of image data which are temporarily stored by said temporary storing module, in accordance with a residual amount of said temporary storing module and in accordance with a frame rate of each of said plurality of image data.

3. The apparatus according to claim 1, further comprising a setting I/F module to which set data regarding said decimation is inputted from an outside, and wherein said control module executes said decimating process on the basis of said set data.

4. The apparatus according to claim 2, further comprising a setting I/F module to which set data regarding said decimation is inputted from an outside, and wherein said control module executes said decimating process on the basis of said set data.

5. The apparatus according to claim 3, wherein the decimation ratio of each of said plurality of image data can be set by said I/F module.

6. The apparatus according to claim 4, wherein a decimation ratio of each of said plurality of image data can be set by said I/F module.

7. The apparatus according to claim 1, further comprising an alarm input module to which an alarm signal is inputted from an outside or an alarm detecting module which detects the alarm signal included in the image data which is inputted to said input module, and wherein said control module executes said decimating process so as to preferentially decimate data other than the image data which is designated by said alarm signal.

8. The apparatus according to claim 2, further comprising an alarm input module to which an alarm signal is inputted from an outside or an alarm detecting module which detects the alarm signal included in the image data which is inputted to said input module, and wherein said control module executes said decimating process so as to preferentially decimate data other than the image data which is designated by said alarm signal.

9. The apparatus according to claim 1, wherein information which is used for discrimination about the decimation is included in said image data, and said control module is constructed by an upper layer by software and a lower layer by hardware and said decimation is processed in said lower layer on the basis of the information included in said image data.

10. The apparatus according to claim 2, wherein information which is used for discrimination about the decimation is included in said image data, and said control module is constructed by an upper layer by software and a lower layer by hardware and said decimation is processed in said lower layer on the basis of the information included in said image data.

11. An image recording system having a plurality of image pickup apparatuses which compress image data obtained by photographing an object and output the compressed image data and an image recording apparatus which inputs said plurality of image data which are outputted from said plurality of image pickup apparatuses and records them, wherein said image recording apparatus comprises:

a temporary storing module which temporarily stores said plurality of image data which are inputted;

a recording module which records said plurality of image data which are outputted from said temporary storing module onto a recording medium; and a control module which decimates said plurality of image data which are temporarily stored by said temporary storing module, in accordance with a residual amount of said temporary storing module and in accordance with a frame rate of each of said plurality of image data.

12. The system according to claim 11, wherein when the residual amount of said temporary storing module is equal to or less than a predetermined value, said control module instructs all or a part of said plurality of image pickup apparatuses to decrease the frame rate and output the image data, and when all or a part of said plurality of image pickup apparatuses receive said instruction, said image pickup apparatuses decrease the frame rate to a value smaller than that before said instruction is received and output said image data.

* * * * *